United States Patent
Morita et al.

(10) Patent No.: US 9,398,228 B2
(45) Date of Patent: Jul. 19, 2016

(54) IMAGE PICKUP APPARATUS, INTERCHANGEABLE LENS, AND CAMERA SYSTEM

(71) Applicant: CANON KABUSHIKI KAISHA, Tokyo (JP)

(72) Inventors: Takuro Morita, Tokyo (JP); Hideya Takanashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/942,082

(22) Filed: Jul. 15, 2013

(65) Prior Publication Data
US 2014/0022434 A1 Jan. 23, 2014

(30) Foreign Application Priority Data
Jul. 18, 2012 (JP) ................................. 2012-159934

(51) Int. Cl.
H04N 5/235 (2006.01)
H04N 5/232 (2006.01)

(52) U.S. Cl.
CPC ......... *H04N 5/2353* (2013.01); *H04N 5/23209* (2013.01)

(58) Field of Classification Search
CPC ...... H04N 5/23209; G03B 17/14; G02B 7/14; G02B 7/16; G02B 5/205; G02B 26/023
USPC ................................... 348/363, 360; 396/241
See application file for complete search history.

(56) References Cited

U.S. PATENT DOCUMENTS 5,325,149 A * 6/1994 Kawahara ...................... 396/259
2009/0244360 A1* 10/2009 Ueda ................... H04N 5/23209
348/360

(Continued)

FOREIGN PATENT DOCUMENTS

CN 101146176 A 3/2008
EP 1725024 A3 1/2012

(Continued)

OTHER PUBLICATIONS

Foreign patent documents were cited in the Sep. 8, 2015 Japanese Office Action, which is enclosed without an English Translation, that issued in Japanese Patent Application No. 2012-159934.

(Continued)

*Primary Examiner* — Mekonnen Dagnew
(74) *Attorney, Agent, or Firm* — Cowan, Liebowitz & Latman, P.C.

(57) ABSTRACT

An image pickup apparatus on which an interchangeable lens is removably mounted, includes an image pickup element configured to perform a photoelectric conversion of an optical image formed via the interchangeable lens, and a controller configured to control a power supply to the interchangeable lens mounted on the image pickup apparatus. When the mounted interchangeable lens is a first type interchangeable lens and a power is turned off, the controller performs an aperture control so as to change a first aperture state set in the interchangeable lens to a second aperture state and then stops the power supply to the interchangeable lens. When the mounted interchangeable lens is a second type interchangeable lens and the power is turned off, the controller maintains the power supply differently from a case where the mounted interchangeable lens is the first type interchangeable lens.

20 Claims, 9 Drawing Sheets

(56) References Cited

U.S. PATENT DOCUMENTS

| | | | |
|---|---|---|---|
| 2011/0292238 A1* | 12/2011 | Katsumata | 348/223.1 |
| 2012/0050556 A1* | 3/2012 | Hamada | 348/220.1 |
| 2012/0262592 A1 | 10/2012 | Rabii | |
| 2013/0195436 A1* | 8/2013 | Yamada | G03B 9/06 396/260 |
| 2014/0307159 A1* | 10/2014 | Takagi | H04N 5/2254 348/364 |

FOREIGN PATENT DOCUMENTS

| | | |
|---|---|---|
| JP | 04-285921 A | 10/1992 |
| JP | 2000-137276 A | 5/2000 |
| JP | 2008-217607 A | 9/2008 |
| JP | 2009-260959 A | 11/2009 |
| JP | 2011-149971 A | 8/2011 |

OTHER PUBLICATIONS

Patent documents were cited in a Mar. 3, 2016 Chinese Office Action, which is enclosed with an English Translation, that issued in Chinese Patent Application No. 201310297069.0.

* cited by examiner

| CAMERA COMMAND | NUMBER OF DATA | MEANING OF COMMAND |
| --- | --- | --- |
| 10H | 2 | REQUEST FOR LENS INFORMATION |
| 12H | 4 | REQUEST FOR PREPARING PROCESSING TO START LENS CONTROL |
| 14H | 4 | REQUEST FOR PREPARING PROCESSING TO CUT OFF POWER SUPPLY |
| 20H | 0 | REQUEST FOR STARTING AF OPERATION |

FIG. 4

IMAGE PICKUP APPARATUS, INTERCHANGEABLE LENS, AND CAMERA SYSTEM

BACKGROUND OF THE INVENTION

1. Field of the Invention

The present invention relates to an image pickup apparatus on which an interchangeable lens is removably mounted.

2. Description of the Related Art

In a camera system represented by a digital single-lens reflex camera, a power is supplied from a camera in a state where an interchangeable lens is mounted on the camera, and control information, various kinds of lens data, and the like are sent and received between the camera and the interchangeable lens. For example, when a lens for a moving image as the interchangeable lens is mounted on the camera, it is preferred that a control which emphasizes saving the power is performed since the power supply to the interchangeable lens (power consumption) is increased. A camera exclusively used as an electronic view finder (An exclusive camera for EVF) has one advantage that its size is reduced since a mirror member is not used, but according to this, a flange back (a flange focal length) has to be designed to be short. As a result, it is necessary to perform a control so as to protect an image sensor that does not have a protection member.

Japanese Patent Laid-Open No. 2011-149971 discloses a configuration of issuing a notification command that previously notifies a power cut-off before the power cut-off of the interchangeable lens, and of performing a power cut-off processing between the camera and the lens after information of the lens are stored. Japanese Patent Laid-Open No. 2009-260959 discloses a method of controlling the cut-off of the power after an aperture unit is controlled to be a predetermined light amount at the time of cutting off the power in order to protect an image sensor.

However, as an interchangeable lens removably mounted on the image pickup apparatus, there are lenses such as a lens for taking a still image or a lens for taking a moving image which have usages different from each other. Furthermore, there are an interchangeable lens which has a switch to switch a function such as an AF (autofocus) and an MF (manual focus) or an interchangeable lens which does not have the switch. On the other hand, in the configurations of Japanese Patent Laid-Open No. 2011-149971 and Japanese Patent Laid-Open No. 2009-260959, an appropriate control in accordance with a type of the interchangeable lens, specifically an appropriate aperture control at the time of turning on the power or an appropriate function switching control, cannot be performed.

BRIEF SUMMARY OF THE INVENTION

The present invention provides an image pickup apparatus and an interchangeable lens that perform an appropriate aperture control when a power is turned off in accordance with a type of the interchangeable lens. The present invention also provides an image pickup apparatus and an interchangeable lens that appropriately switch a function in accordance with the type of the interchangeable lens. The present invention also provides a camera system including the image pickup apparatus and the interchangeable lens.

An image pickup apparatus as one aspect of the present invention is an image pickup apparatus on which an interchangeable lens is removably mounted, and the image pickup apparatus includes an image pickup element configured to perform a photoelectric conversion of an optical image formed via the interchangeable lens, and a controller configured to control a power supply to the interchangeable lens mounted on the image pickup apparatus. When the mounted interchangeable lens is a first type interchangeable lens and a power is turned off, the controller performs an aperture control so as to change a first aperture state set in the interchangeable lens to a second aperture state and then stops the power supply to the interchangeable lens. When the mounted interchangeable lens is a second type interchangeable lens and the power is turned off, the controller maintains the power supply differently from a case where the mounted interchangeable lens is the first type interchangeable lens.

An image pickup apparatus as another aspect of the present invention is an image pickup apparatus on which an interchangeable lens is removably mounted, and the image pickup apparatus includes an image pickup element configured to perform a photoelectric conversion of an optical image formed via the interchangeable lens, and a controller configured to determine whether the interchangeable lens has a switch that switches a predetermined function based on a type of the interchangeable lens. When the controller determines that the interchangeable lens has the switch, the controller turns on a power of the image pickup apparatus and reflects switching of the predetermined function in the image pickup apparatus after receiving a notification indicating that the switch has been switched from the interchangeable lens. When the controller determines that the interchangeable lens does not have the switch, the controller displays necessity of the switching of the predetermined function as a menu item on a display after the power of the image pickup apparatus is turned on.

An interchangeable lens as another aspect of the present invention is an interchangeable lens removably mounted on an image pickup apparatus, and the interchangeable lens includes an aperture unit configured to adjust a light amount, a terminal configured to be a predetermined voltage in connection with the image pickup apparatus, and a controller configured to control the aperture unit. When a power is cut off, the controller performs an aperture control so as to change a first aperture state to a second aperture state in accordance with a command from the image pickup apparatus and then informs the image pickup apparatus of completion of the aperture control.

An interchangeable lens as another aspect of the present invention is an interchangeable lens removably mounted on an image pickup apparatus, and the interchangeable lens includes a lens-type determining portion configured to send information related to a type of the interchangeable lens to the image pickup apparatus, and a controller. The lens-type determining portion determines whether the interchangeable lens has a switch that switches a predetermined function based on the type of the interchangeable lens. When the interchangeable lens has the switch, the controller informs the image pickup apparatus that the switch has been switched so that a power of the image pickup apparatus is turned on and switching of the predetermined function is reflected in the image pickup apparatus.

A camera system as another aspect of the present invention includes the image pickup apparatus and an interchangeable lens removably mounted on the image pickup apparatus.

Further features and aspects of the present invention will become apparent from the following description of exemplary embodiments with reference to the attached drawings.

BRIEF DESCRIPTION OF THE DRAWINGS

FIG. 4 is a command table of illustrating a camera command that is sent from a camera microcomputer to a lens microcomputer in Embodiment 1.

DETAILED DESCRIPTION OF THE PREFERRED EMBODIMENTS

Figure 1:
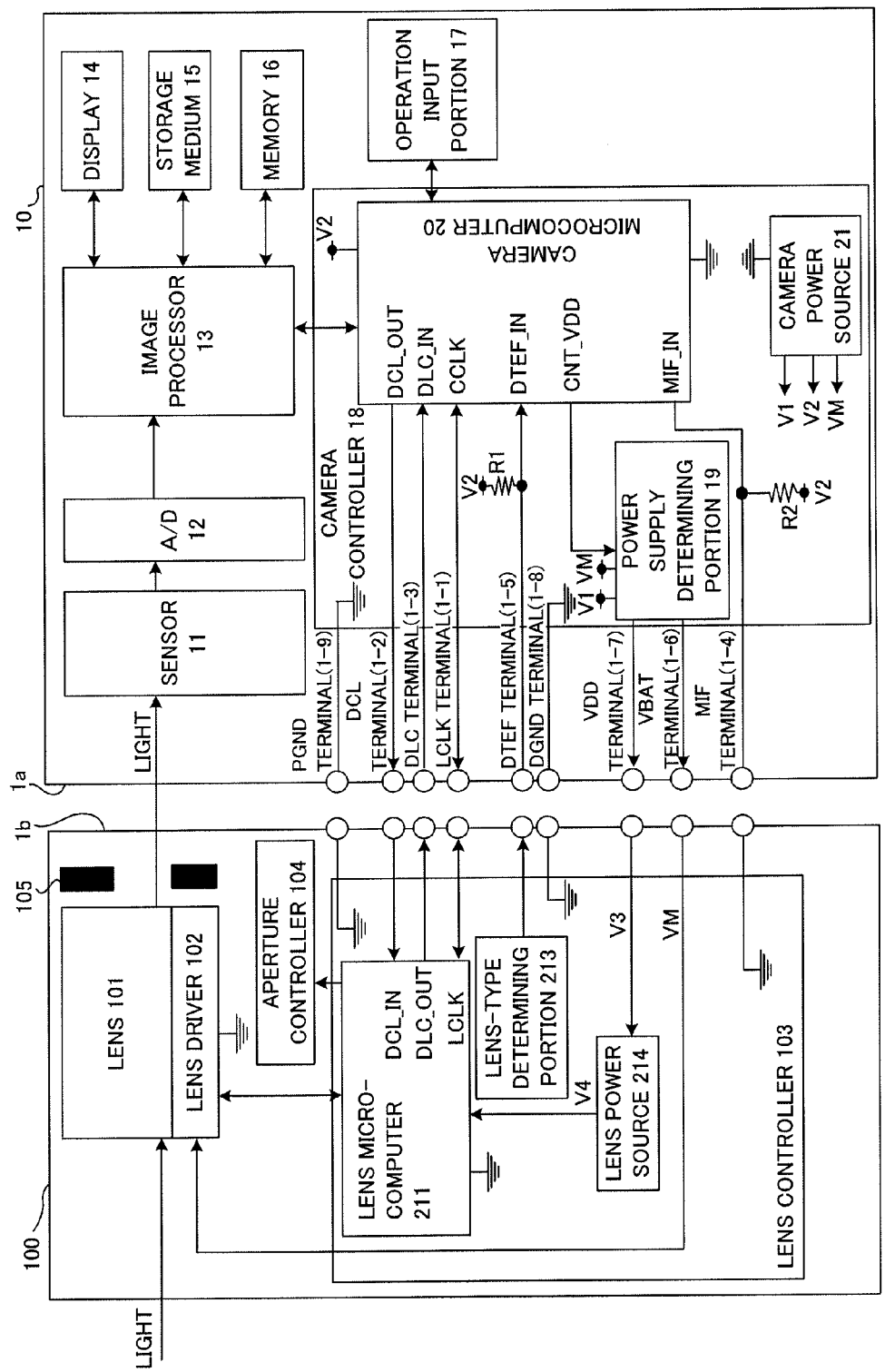
FIG. 1 is a block diagram of a camera system in Embodiment 1.

Exemplary embodiments of the present invention will be described below with reference to the accompanied drawings. In each of the drawings, the same elements will be denoted by the same reference numerals and the duplicate descriptions thereof will be omitted.

[Embodiment 1]

First of all, referring to FIG. 1, a configuration of a camera system in Embodiment 1 of the present invention will be described. FIG. 1 is a block diagram of the camera system in the present embodiment. The camera system of the present embodiment is configured by including a camera 10 (an image pickup apparatus) and an interchangeable lens 100 removably mounted on the camera 10. The camera 10 and the interchangeable lens 100 respectively include mounts 1a and 1b (a camera mount and a lens mount) each including an electric connector to supply a power from the camera 10 to the interchangeable lens 100 or communicate with each other. The present embodiment is described with respect to the interchangeable lens 100 capable of mounting on the camera, but can also be applied to a camera accessory other than the interchangeable lens 100.

The camera 10 includes a sensor 11 (an image sensor, or an image pickup element) that performs a photoelectric conversion of an object image as an optical image formed via an image pickup lens 101 in the interchangeable lens 100 so as to output an electric signal. In addition, the camera 10 includes an A/D converter 12 that converts an analog electric signal outputted from the sensor 11 into a digital signal, and an image processor 13 that performs various kinds of image processings for this digital signal so as to generate an image signal. The image signal (a still image or a moving image) is displayed on a display 14 or is recorded on a storage medium 15.

The camera 10 includes a memory 16 that stores an operation program used by a camera controller 18 described below. In addition, the camera 10 has an operation input portion 17 including a power switch that turns on or off the power, a shooting switch that starts a record of the image signal (the still image), an image switch that starts a record of the image signal (the moving image), and a selecting/setting switch to set various kinds of menus. The camera controller 18 includes a camera microcomputer 20 (a microcomputer), which controls the image processor 13 in accordance with a signal from the operation input portion 17 and also controls a lens communication with the interchangeable lens 100. The camera controller 18 includes a power supply determining portion 19 and a camera power source 21, and details of them will be described below.

On the other hand, the interchangeable lens 100 includes a focus lens and a zoom lens (not shown) contained in the image pickup lens 101 and a lens driver 102 that drives an actuator to move and operate an image stabilizing lens. The interchangeable lens 100 has a lens controller 103 that includes a lens microcomputer 211 (a microcomputer) to control the lens driver 102 in accordance with a control signal received from the camera controller 18 via the communication. An aperture controller 104 controls an aperture mode (not shown) in accordance with the control signal from the lens microcomputer 211 so as to control an aperture unit 105. An F-number (an aperture state) of the aperture unit 105 is controlled by the aperture controller 104 based on an instruction (a command) of the lens microcomputer 211 (a controller), and thus a light amount is adjusted. The lens controller 103 includes a lens-type determining portion 213 and a lens power source 214, and details of them will be described below.

As illustrated in FIG. 1, the mounts 1a and 1b are provided with various kinds of terminals to perform the electric connections between the camera 10 (the camera controller 18) and the interchangeable lens 100 (the lens controller 103). An LCLK terminal 1-1 is a terminal for a communication clock signal inputted and outputted between the camera 10 and the interchangeable lens 100. A DCL terminal 1-2 is a terminal for communication data outputted from the camera 10 to the interchangeable lens 100. A DLC terminal 1-3 is a terminal for communication data outputted from the interchangeable lens 100 to the camera 10. An MIF terminal 1-4 is a terminal to detect that the interchangeable lens 100 is mounted on the camera 10. The camera controller 18 detects that the interchangeable lens 100 is mounted on the camera 10 based on a voltage of the MIF terminal.

A DTEF terminal 1-5 is a terminal to detect a type of the interchangeable lens 100 mounted on the camera 10. The camera controller 18 detects the type of the interchangeable lens 100 mounted on the camera 10 based on a voltage of the DTEF terminal. A VBAT terminal 1-6 is a terminal to supply a driving power VM that is used for various kinds of operations except for communication controls from the camera 10 to the interchangeable lens 100. A VDD terminal 1-7 is a terminal to supply a communication controlling power VDD that is used for the communication control and that is supplied from the camera 10 to the interchangeable lens 100. A DGND terminal 1-8 is a terminal to connect communication control systems of the camera 10 and the interchangeable lens 100 to ground (GND). A PGND terminal 1-9 is a terminal to connect mechanical drive systems including a motor or the like that are provided in the camera 10 and the interchangeable lens 100 to ground.

The camera power source 21 provided in the camera controller 18 converts a battery voltage supplied from a battery (not shown) mounted on the camera 10 into a voltage needed for the operation of each circuit. In this case, the camera power source 21 generates voltages V1, V2, and VM. The voltage V1 (a first voltage) is a communication voltage of the interchangeable lens 100, as well as a power supply voltage as a communication controlling voltage VDD of the interchangeable lens 100. The voltage V2 (a second voltage) is a power supply voltage as a power supply for operating the camera microcomputer 20. The voltage VM (a third voltage) is a power supply voltage as a power supply for driving the interchangeable lens 100. The voltage V1 and the voltage V2 or the voltage VM may be set to be equal to each other, or the voltage V2 and the voltage V1 or the voltage VM may be set to be equal to each other.

When a H (High) level signal is inputted from a CNT_DD terminal of the camera microcomputer 20, the power supply determining portion 19 supplies the voltage VM from the camera 10 to the interchangeable lens 100 via the VBAT terminal 1-6. In this case, the power supply determining portion 19 converts the voltage V1 into the voltage V3, and supplies a power (the voltage V3) to the lens power source 214 via the VDD terminal. Details of them will be described below.

The camera microcomputer 20 communicates with the interchangeable lens 100. The camera microcomputer 20 includes a CCLK terminal of inputting and outputting a communication clock signal, a DCL_OUT terminal of outputting communication data to the interchangeable lens 100, and a DLC_IN terminal of receiving an input of communication data from the interchangeable lens 100. The communication clock signal and the communication data correspond to communication signals. The camera microcomputer 20 functions as a camera communication unit. The camera microcomputer 20 includes an MIF_IN terminal of detecting the mount of the interchangeable lens 100 and a DTEF_IN terminal of identifying the type of the interchangeable lens 100. The camera microcomputer 20 also includes a CNT_VDD terminal of outputting an energization signal to the power supply determining portion 19, a connection terminal with the image processor 13, and a connection terminal with the operation input portion 17.

The lens power source 214 as a voltage generating unit converts the voltage VDD (the voltage V3) supplied from the camera 10 to the interchangeable lens 100 into the voltage V4 (a fourth voltage). The lens microcomputer 211 in the lens controller 103 communicates with the camera microcomputer 20. The lens microcomputer 211 includes an LCLK terminal of inputting and outputting a communication clock signal, a DCL_out terminal of outputting the communication data to the camera 10, a DLC_IN terminal of receiving the input of the communication data from the camera 10, and a connection terminal with the lens driver 102. The lens microcomputer 211 functions as a lens communication unit.

Subsequently, detection of mounting the interchangeable lens 100 on the camera 10 will be described. The MIF_IN terminal of the camera microcomputer 20 is pulled up to a power supply by a resistor R2 (100KΩ). Therefore, when the interchangeable lens 100 is not mounted on the camera 10, a voltage value of the MIF_IN terminal is H (High). On the other hand, when the interchangeable lens 100 is mounted, the MIF_IN terminal is connected to ground (GND) of the interchangeable lens 100. Therefore, when the interchangeable lens 100 is mounted on the camera 10, the voltage value of the MIF_IN terminal is L (Low) regardless of the type of the interchangeable lens 100.

Figure 2A:
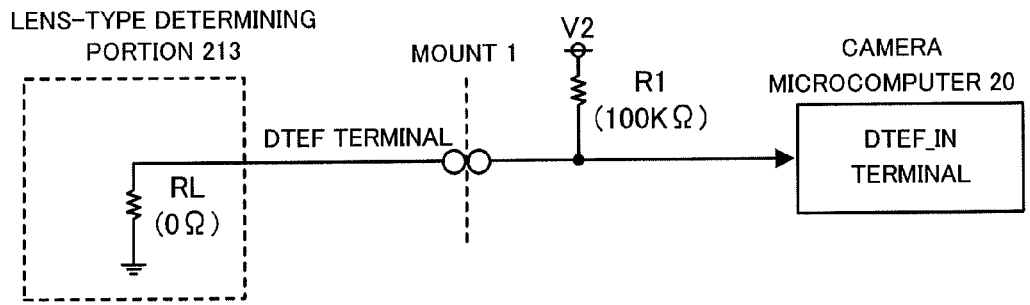
FIGS. 2A and 2B are diagrams of describing a method of determining a type of an interchangeable lens in Embodiment 1.
Figure 2B:
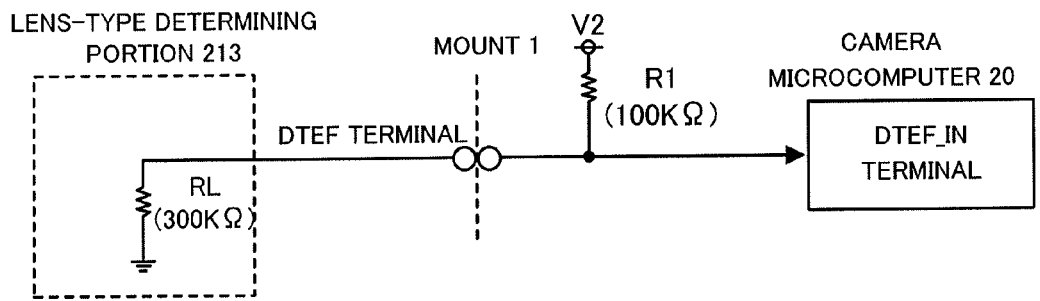

Subsequently, a configuration example of the lens-type determining portion 213 will be described. The lens-type determining portion 213 sends information related to the type of the interchangeable lens 100 to the camera 10. The lens-type determining portion 213 is configured by including a resistor RL as a resistor at the side of the interchangeable lens 10 that is provided between the DTEF terminal 1-5 and the ground (GND) provided on the mounts 1a and 1b. As a resistor value of the resistor RL, a value depending on the type of the interchangeable lens 100 is previously set. Referring to FIGS. 2A and 2B, a method of determining the type of the interchangeable lens 100 for a first type interchangeable lens and a second type interchangeable lens (the interchangeable lens 100) having types different from each other will be described. FIGS. 2A and 2B are diagrams of describing the method of determining the type of the interchangeable lens 100. FIG. 2A illustrates a case where the first type interchangeable lens as the interchangeable lens 100 is mounted on the camera 10, and FIG. 2B illustrates a case where the second type interchangeable lens is mounted on the camera 10. The lens-type determining portion 213 of the first type interchangeable lens is provided with the resistor RL of 0Ω. On the other hand, the lens-type determining portion 213 of the second type interchangeable lens is provided with the resistor RL of 300KΩ.

In the present embodiment, the first type interchangeable lens is a power-off permitted lens (a lens for a moving image), and the second type interchangeable lens is a power-off unpermitted lens (a lens for a still image, or a lens having an AF/MF switch). In the camera 10, a resistor R1 (for example, 100KΩ) as a resistor at a side of the camera 10 is connected between the DTEF terminal 1-5 of the mount 1a and the voltage V2 for operating the camera microcomputer 20. The DTEF terminal 1-5 is connected to the DTEF_IN terminal of the camera microcomputer 20. The DTEF_IN terminal of the camera microcomputer 20 includes an AD conversion function (for example, an AD conversion function of 10 bits).

Subsequently, an operation of determining the type of the interchangeable lens 100 by the camera microcomputer 20 will be described. The camera microcomputer 20 determines the type of the mounted interchangeable lens 100 in accordance with the voltage value inputted to the DTEF_IN terminal. Specifically, the camera microcomputer 20 performs the AD conversion of the inputted voltage value and compares the AD conversion value with a reference of determining the type of the lens that is previously stored in the camera microcomputer 20 so as to determine the type of the interchangeable lens 100.

For example, when the first type interchangeable lens is mounted on the camera 10, the AD conversion value of the voltage inputted to the DTEF_IN terminal is a resistor ratio RL/(R1+RL) of the resistor R1 (100KΩ) and the resistor RL (0Ω), which is determined to be substantially "0×0000". Therefore, the camera microcomputer 20 detects that the AD conversion value of the DTEF_IN terminal is within a range of "0×0000~0×007F" that is a first reference of determining the type of the lens and that determines that the mounted interchangeable lens 100 is the first type interchangeable lens.

On the other hand, when the second type interchangeable lens is mounted on the camera 10, the AD conversion value of the voltage inputted to the DTEF_IN terminal is a resistor ratio RL/(R1+RL) of the resistor R1 (100KΩ) and the resistor RL (300KΩ), which is determined to be substantially "0×02FF". Therefore, the camera microcomputer 20 detects that the AD conversion value of the DTEF_IN terminal is within a range of "0×0280~0×037F" that is a second reference of determining the type of the lens and that determines that the mounted interchangeable lens 100 is the second type interchangeable lens.

Subsequently, a method of controlling the power supply from the camera 10 to the interchangeable lens 100, in accordance with the type of the interchangeable lens 100, will be described. The camera microcomputer 20 determines whether the interchangeable lens 100 mounted on the camera 10 is the power-off permitted lens, for example, in accordance with the following Table 1.

TABLE 1

| MOUNTED LENS | FIRST TYPE INTER-CHANGEABLE lens | SECOND TYPE INTER-CHANGEABLE LENS | RESERVED | NON-SUPPORTED LENS |
|---|---|---|---|---|
| DTEF_IN TERMINAL DETERMINATION OF POWER-OFF PERMITTED LENS | 0x0000~ 0x007F PERMITTED | 0x0280~ 0x037F NOT PERMITTED | — NOT DETERMINED | — NOT DETERMINED |

As described above, the camera microcomputer 20 determines the type of the interchangeable lens 100 mounted on the camera 10 based on the voltage value (the AD conversion value) that is inputted to the DTEF_IN terminal. Then, the camera microcomputer 20 determines whether the interchangeable lens 100 mounted on the camera 10 is the power-off permitted lens or the power-off unpermitted lens in accordance with a determination result of the type of the interchangeable lens 100. Specifically, when the camera microcomputer 20 determines that the interchangeable lens 100 is the first type interchangeable lens based on the voltage value of the DTEF_IN terminal, the camera microcomputer 20 outputs a L (Low) level signal from the CNT_VDD terminal at the time of turning off the power of the camera 10. When the L (Low) level signal is outputted from the CNT_VDD terminal, the power supply determining portion 19 stops the output of the voltage V3 that is obtained by converting the power supply voltage (the voltage V1) generated by the camera power source 21 to the lens power source 214. In this time, the output of the power supply voltage (the voltage VM) generated by the camera power source 21 to the lens driver 102 is also stopped.

When the camera microcomputer 20 determines that the mounted interchangeable lens 100 is the second type interchangeable lens based on the voltage value of the DTEF_IN terminal, the camera microcomputer 20 also outputs the H (High) level signal from the CNT_VDD terminal at the time of turning off the power of the camera 10. When the H (High) level signal is outputted from the CNT_VDD terminal, the power supply determining portion 19 converts the voltage V21 (the power supply voltage) generated by the camera power source 21 into the voltage V3 so as to be outputted to the lens power source 214. The power supply determining portion 19 outputs the voltage VM (the power supply voltage) generated by the camera power source 21 to the lens driver 102.

When the camera microcomputer 20 detects the voltage value out of the range of the first or second reference of determining the type of the lens described above as the voltage value (the AD conversion value) of the DTEF_IN terminal, it determines that an interchangeable lens which is not supported by the camera 10 (a non-supported lens) is mounted. Alternatively, the camera microcomputer 20 reserves the determination of the type of the lens because the determination of the type of the lens cannot be normally performed. In these cases, the camera microcomputer 20 does not supply the power to the interchangeable lens 100, i.e. the camera microcomputer 20 outputs the L level signal from the CNT_VDD terminal.

Figure 3:
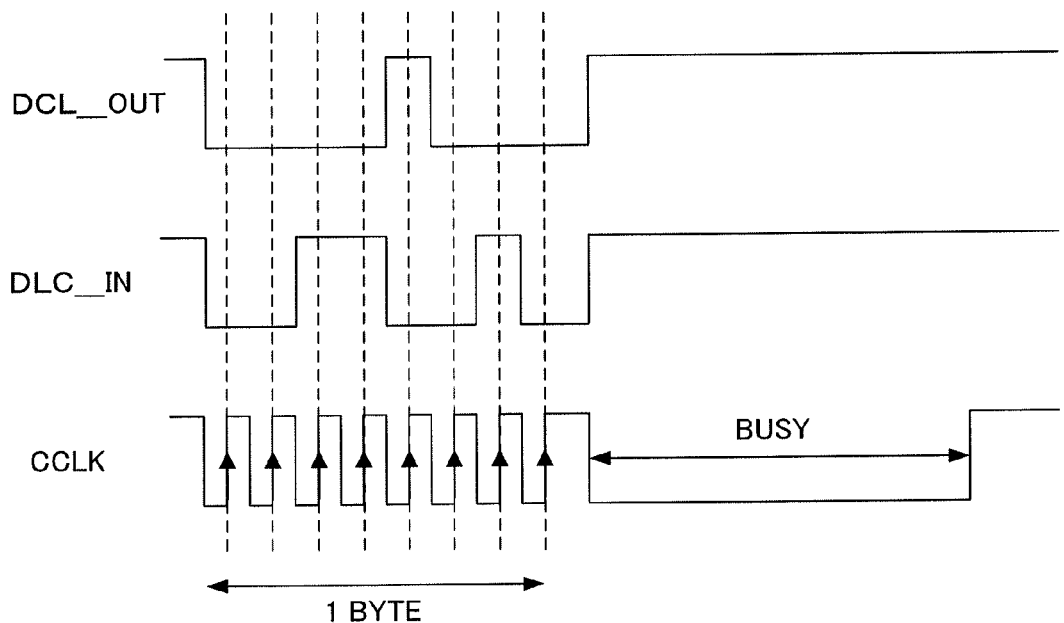
FIG. 3 is a diagram of illustrating a signal waveform in communications between a camera and the interchangeable lens in Embodiment 1.

Next, referring to FIGS. 3 and 4, a specific communication between the camera 10 and the interchangeable lens 100 will be described. FIG. 3 is a diagram of illustrating signal waveforms of the DCL_OUT, DLC_IN, and CCLK terminals in the communication between the camera 10 and the interchangeable lens 100. Since the DLC_OUT terminal and the CCLK terminal are synchronous clock communication terminals, the camera microcomputer 20 sends DLC_OUT data in synchronization with a rising signal of the CCLK terminal.

For the signal waveform of the CCLK terminal, a region in which the L level signal is outputted for a certain period of time indicates a state in which the lens microcomputer 211 decreases the level of the CCLK terminal to the L level so as to wait for the processing of the lens microcomputer 211 (Busy state). When the lens microcomputer 211 finishes the communication processing, it performs a processing to return the level of the LCLK terminal to the H level. Similarly, since the DCL_IN terminal and the CCLK terminal perform synchronous clock communications, the camera microcomputer 20 receives the DCL_IN data in synchronization with the rising of the CCLK terminal.

FIG. 4 is a command table of illustrating camera commands that are sent from the camera microcomputer 20 to the lens microcomputer 211. As illustrated in the table of FIG. 4, an amount of data that the camera microcomputer 20 inputs and outputs is previously determined in accordance with the camera command. For example, when a camera command 10H is sent from the camera microcomputer 20 to the lens microcomputer 211, the lens microcomputer 211 recognizes it is a request for lens information to obtain the lens information such as a lens ID or AF/MF mode information. In this case, since the number of data is 2, the lens information as two-byte data are sent to the camera microcomputer 20 in synchronization with the CCLK signal.

As an example of other camera commands, a camera command 12H is a four-byte command of a request for preparing a processing to start controlling a lens. This is a command for requesting an initialization of each unit in the interchangeable lens 100 such as an aperture unit to start driving a lens. A camera command 14H is a four-byte command of a request for preparing a processing to cut off the power supply, and the interchangeable lens 100 receiving this command performs a focus stopping control, an IS drive stopping control, and an aperture control. A camera command 20H is a request command to start an AF operation to the interchangeable lens 100. In addition, many kinds of commands exist in commands that are sent from the lens microcomputer 211 (lens commands), but details of them are omitted.

Figure 5A:
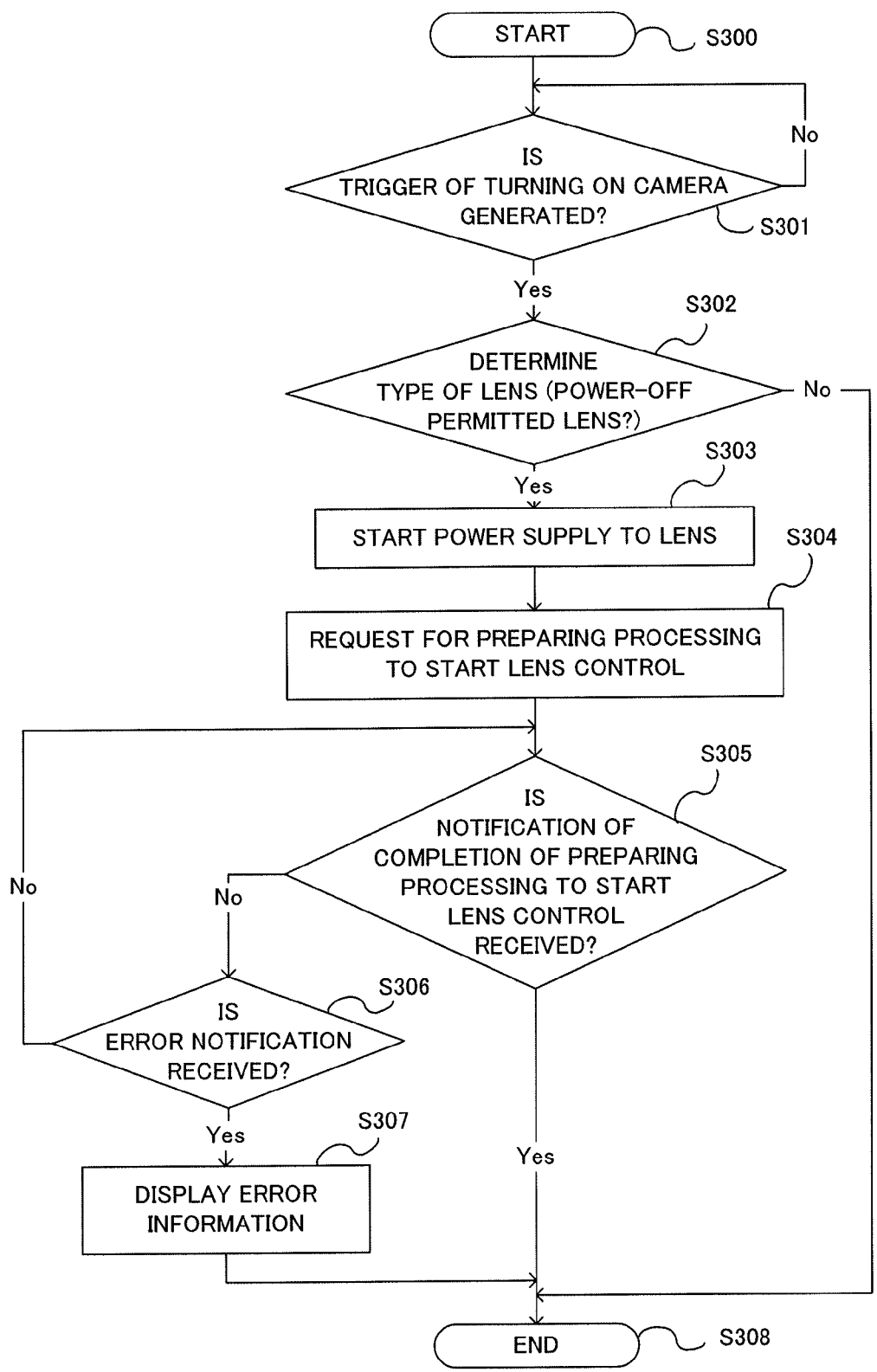
FIG. 5A is a flowchart of illustrating an operation of the camera when the camera is changed from a power-off state to a power-on state in Embodiment 1.

Next, referring to FIGS. 5A and 5B, specific operations of the camera 10 and the interchangeable lens 100 while the camera 10 changes from the power-off state to the power-on state will be described. FIG. 5A is a flowchart of illustrating the operation of the camera 10 while the camera 10 changes from the power-off state to the power-on state. This flow is, for example, performed in accordance with a program that is stored in the camera microcomputer 20.

When this flow starts in Step S300, first of all, in Step S301, the camera microcomputer 20 determines whether a trigger to change a state of the camera 10 to the power-on state (a power-on trigger for the camera) is generated. This trigger is a trigger that is generated when a user changes a power switch (not shown) of the camera 10 from an off state to an on state, or a trigger that is generated when the interchangeable lens 100 is newly mounted on the camera 10. The camera microcomputer 20 repeats Step S301 until the power-on trigger for the camera is generated. On the other hand, when the power-on trigger for the camera is generated, the flow proceeds to Step S302.

Subsequently, in Step S302, the type of the lens is determined. The camera microcomputer 20 determines the type of the interchangeable lens 100 in accordance with the voltage level outputted from the lens-type determining portion 213, i.e. determines whether the mounted interchangeable lens 100 is the power-off permitted lens. In accordance with the determination result in Step S302, when it is determined that the mounted interchangeable lens 100 is the power-off permitted lens, the flow proceeds to Step S303. On the other hand, when the interchangeable lens 100 is not the power-off permitted lens, the flow proceeds to Step S308 and the flow is finished.

In Step S303, the camera microcomputer 20 sets the CNT_VDD terminal to the H level, and controls the power supply determining portion 19 so as to supply the power to the interchangeable lens 100. Subsequently, in Step S304, the camera microcomputer 20 issues the command of a request for preparing a processing to start controlling the lens by the command communication, and thus the camera microcomputer 20 requests a control for the initialization of each unit such as an initialization processing of the aperture in order to start driving the lens in the interchangeable lens 100. The initialization processing of the aperture is a control to perform an aperture drive (an aperture opening processing) up to an F-number set in the camera 10, and the aperture control is performed by the lens microcomputer 211 controlling the aperture controller 104.

Subsequently, in Step S305, the camera microcomputer 20 determines whether the preparing processing to start controlling the lens (the aperture opening processing) by the interchangeable lens 100 is normally completed, i.e. whether a notification of the completion is received. When the preparing processing to start controlling the lens is normally completed, the flow proceeds to Step S308 and the flow is finished.

On the other hand, in Step S305, when it is determined that the preparing processing to start controlling the lens (the aperture opening processing) is not normally completed, the flow proceeds to Step S306. In Step S306, the camera microcomputer 20 determines whether an error notification is received during the preparing processing to start controlling the lens. When the camera microcomputer 20 receives the error notification, the flow proceeds to Step S307 and the information of the error notification are displayed on the display 14, and the flow is finished in Step S308. On the other hand, when the error notification is not received, the flow returns to Step S305, and the camera microcomputer 20 waits for the notification from the interchangeable lens 100.

Figure 5B:
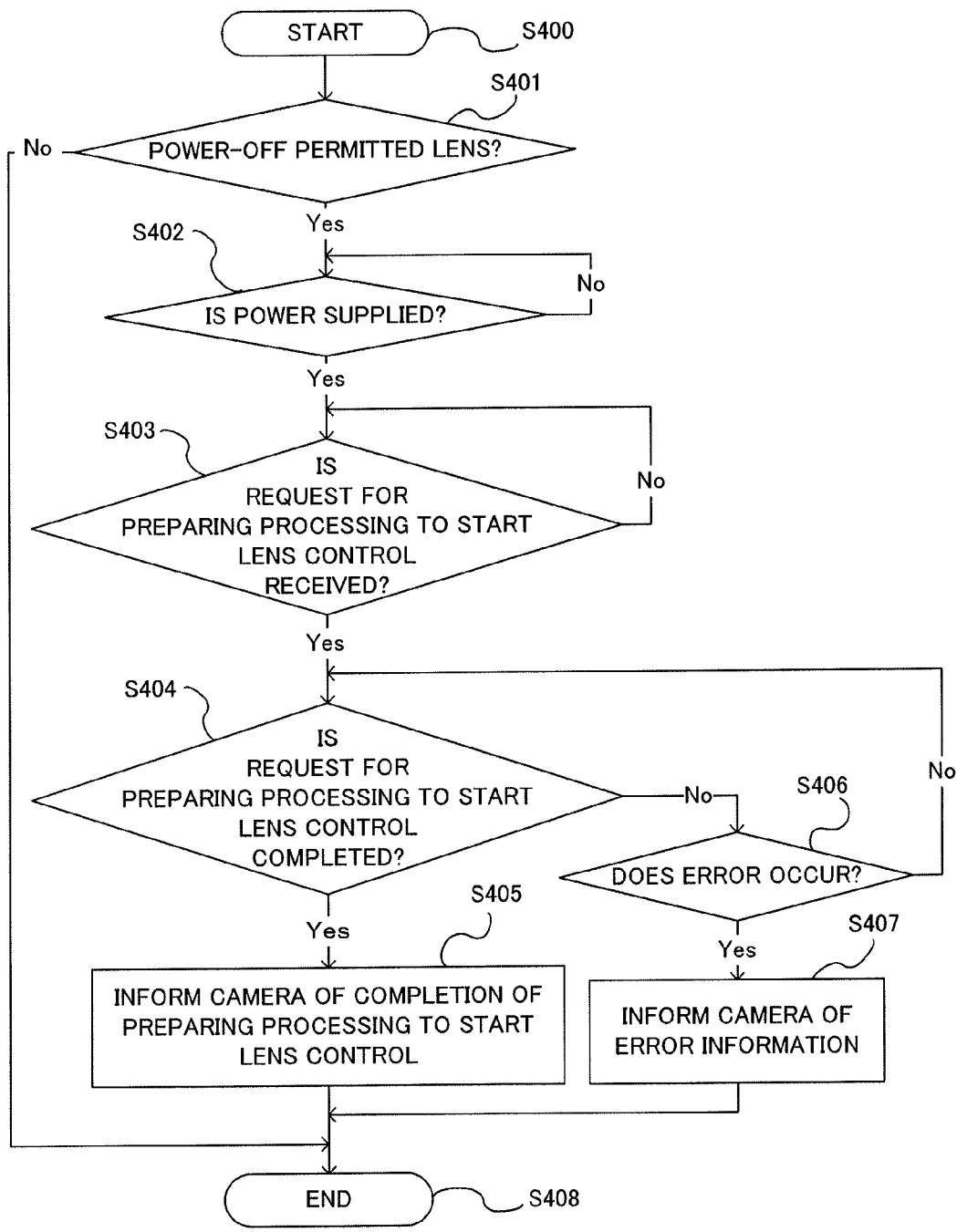
FIG. 5B is a flowchart of illustrating an operation of the interchangeable lens when the camera changes from the power-off state to the power-on state in Embodiment 1.

FIG. 5B is a flowchart of illustrating an operation of the interchangeable lens 100 when the state of the camera 10 changes from the power-off state to the power-on state. This flow is, for example, performed in accordance with a program that is stored in the lens microcomputer 211. When this flow starts in Step S400, first of all, in Step S401, the camera microcomputer 20 (or the lens microcomputer 211) determines whether the interchangeable lens 100 mounted on the camera 10 is the power-off permitted lens. When the interchangeable lens 100 is not the power-off permitted lens, the interchangeable lens 100 is always in a power-supply state and the state does not change from a power cutoff state to the power supply state, and therefore the processing of this flow is finished.

On the other hand, in Step S401, when the interchangeable lens 100 is the power-off permitted lens, the flow proceeds to Step S402. In Step S402, the lens microcomputer 211 waits for the supply of the power from the camera microcomputer 20. When the power is supplied to the lens microcomputer 211, the flow proceeds to Step S403. Subsequently, in Step S403, the lens microcomputer 211 determines whether the request for preparing the processing to start controlling the lens, i.e. the command communication of the request command of the preparing processing to start controlling the lens, is received from the camera microcomputer 20. The lens microcomputer 211 repeats Step S403 until this command communication is received. On the other hand, when the lens microcomputer 211 receives this command communication, it issues an initialization control command to start the lens drive to each unit such as the lens driver 102. In the initialization control in this case, the aperture unit 105 is also initialized. Specifically, a processing to open the aperture to the F-number set in the camera 10 (the aperture opening processing) is performed.

Subsequently, in Step S404, the lens microcomputer 211 determines whether the initialization control based on the initialization control command in Step S403 is completed. When the initialization processing is normally completed, the flow proceeds to Step S405. Then, in Step S405, the lens microcomputer 211 informs the camera microcomputer 20 of the completion of the preparing processing to start controlling the lens. Then, in Step S408, the lens microcomputer 211 finishes this flow.

On the other hand, in Step S404, when the initialization processing is not normally completed, the flow proceeds to Step S406. In Step S406, the lens microcomputer 211 determines whether the initialization processing by the initialization control command issued in Step S403 has failed, i.e. whether the error has been generated. When the initialization processing has failed, the flow proceeds to Step S407. Then, in Step S407, the lens microcomputer 211 informs the camera microcomputer 20 of the error notification of the failure of the initialization processing generated in Step S406, and then this flow is finished. On the other hand, when the initialization processing does not fail, the flow returns to Step S404, and the lens microcomputer 211 waits for the processing result of the initialization control command again.

Figure 6A:
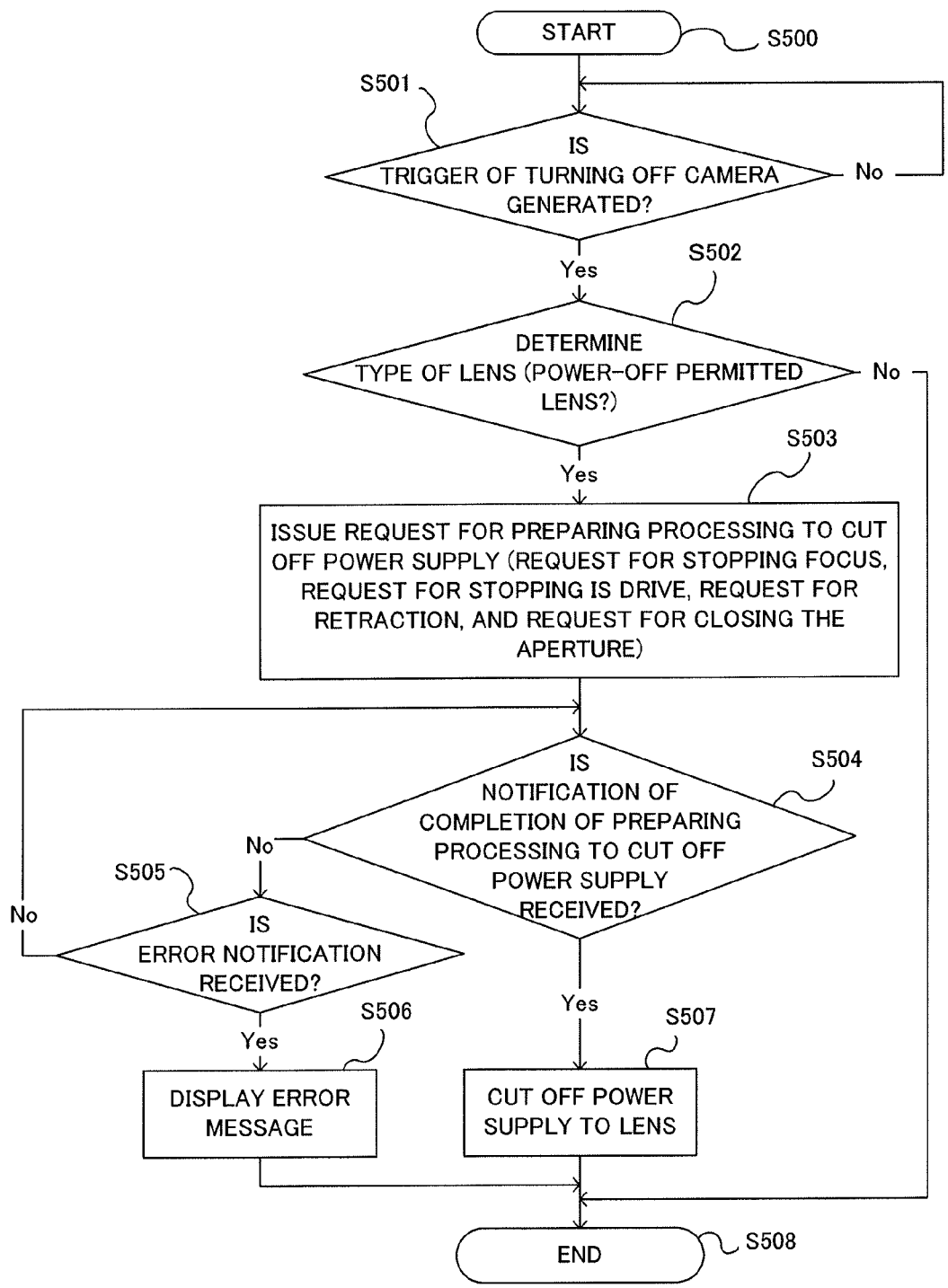
FIG. 6A is a flowchart of illustrating an operation of the camera when the camera changes from the power-on state to the power-off state in Embodiment 1.

Next, referring to FIGS. 6A and 6B, specific operations of the camera 10 and the interchangeable lens 100 when the state of the camera 10 changes from the power-on state to the power-off state will be described. FIG. 6A is a flowchart of illustrating the operation of the camera 10 when the state of the camera 10 changes from the power-on state to the power-off state. This flow is, for example, performed in accordance with a program that is stored in the camera microcomputer 20.

When the flow starts in Step S500, first of all, in Step S501, the camera microcomputer 20 determines whether a trigger to change a state of the camera 10 to the power-off state (a power-off trigger for the camera) is generated. This trigger is a trigger that is generated when a user changes the power switch (not shown) of the camera 10 from the on state to the off state, a trigger that is generated when an operation of the camera 10 is not performed for a predetermined time so that the state of the camera 10 changes to an auto power-off state, or the like. The camera microcomputer 20 repeats Step S501 until the power-off trigger for the camera is generated. On the other hand, when the power-off trigger for the camera is generated, the flow proceeds to Step S502.

Subsequently, in Step S502, the camera microcomputer 20 determines the type of the interchangeable lens 100 mounted on the camera 10, i.e. performs a lens-type determination. In the embodiment, as described above, the type of the interchangeable lens 100 is determined in accordance with the voltage level outputted from the lens-type determining portion 213. In Step S502, when it is determined that the interchangeable lens 100 is the power-off permitted lens, the flow proceeds to Step S503. On the other hand, when the interchangeable lens 100 is not the power-off permitted lens, the flow proceeds to Step S508 and the flow is finished.

In Step S503, the camera microcomputer 20 issues a request for preparing a processing to cut off the power supply (a request for stopping the focus, a request for stopping the IS drive, a request for retraction, and a request for closing the aperture) to the lens microcomputer 211. The lens microcomputer 211 performs processings of stopping the focus, stopping the IS drive, the retraction, and the aperture based on the request for preparing the processing to cut off the power supply. The aperture processing (the aperture control) is a processing of driving the aperture unit 105 so that the F-number (a first aperture state) set at the time of turning off the power of the camera 10 is changed to a predetermined value (a second aperture state) to prevent sunlight from entering the sensor 11. It is preferred that the second aperture state is a minimum aperture state, but the embodiment is not limited to this.

Subsequently, in Step S504, the camera microcomputer 20 determines whether the preparing processing to cut off the power supply is normally performed in response to the command of requesting for the preparing processing to cut off the power supply issued in Step S503. This determination is, specifically performed in accordance with whether a notification of permission to cut off the power supply that is sent from the lens microcomputer 211 is received. When the camera microcomputer 20 receives the notification of permission to cut off the power supply in Step S504, the flow proceeds to Step S507. On the other hand, when the camera microcomputer 20 does not receive the notification of permission to cut off the power supply, the flow proceeds to Step S505.

Subsequently, in Step S507, the camera microcomputer 20 performs the processing to cut off the power supply to the interchangeable lens 100. Specifically, as described above, it is a processing in which the output of the CNT_VDD terminal of the camera microcomputer 20 is set to the L level and the power supply from the power supply determining portion 19 to the interchangeable lens 100 is stopped.

In Step S505, the camera microcomputer 20 determines whether an error notification (error information) is received in response to the command of requesting for the power-off processing that is issued in Step S503. The error notification is a notification that is sent when the processing in response to the request for the preparing processing to cut off the power supply that is performed by the lens microcomputer 211 is in error. When the camera microcomputer 20 receives the error notification, the flow proceeds to Step S506. In Step S506, the camera microcomputer 20 displays the information of the error notification (an error message) that are received in Step S505 on the display 14. Then, the flow proceeds to Step S508 and is finished. On the other hand, when the camera microcomputer 20 does not receive the error notification, the flow returns to Step S504, and the camera microcomputer 20 waits for a completion notice of the preparing processing to cut off the power supply from the lens microcomputer 211 again.

Figure 6B:
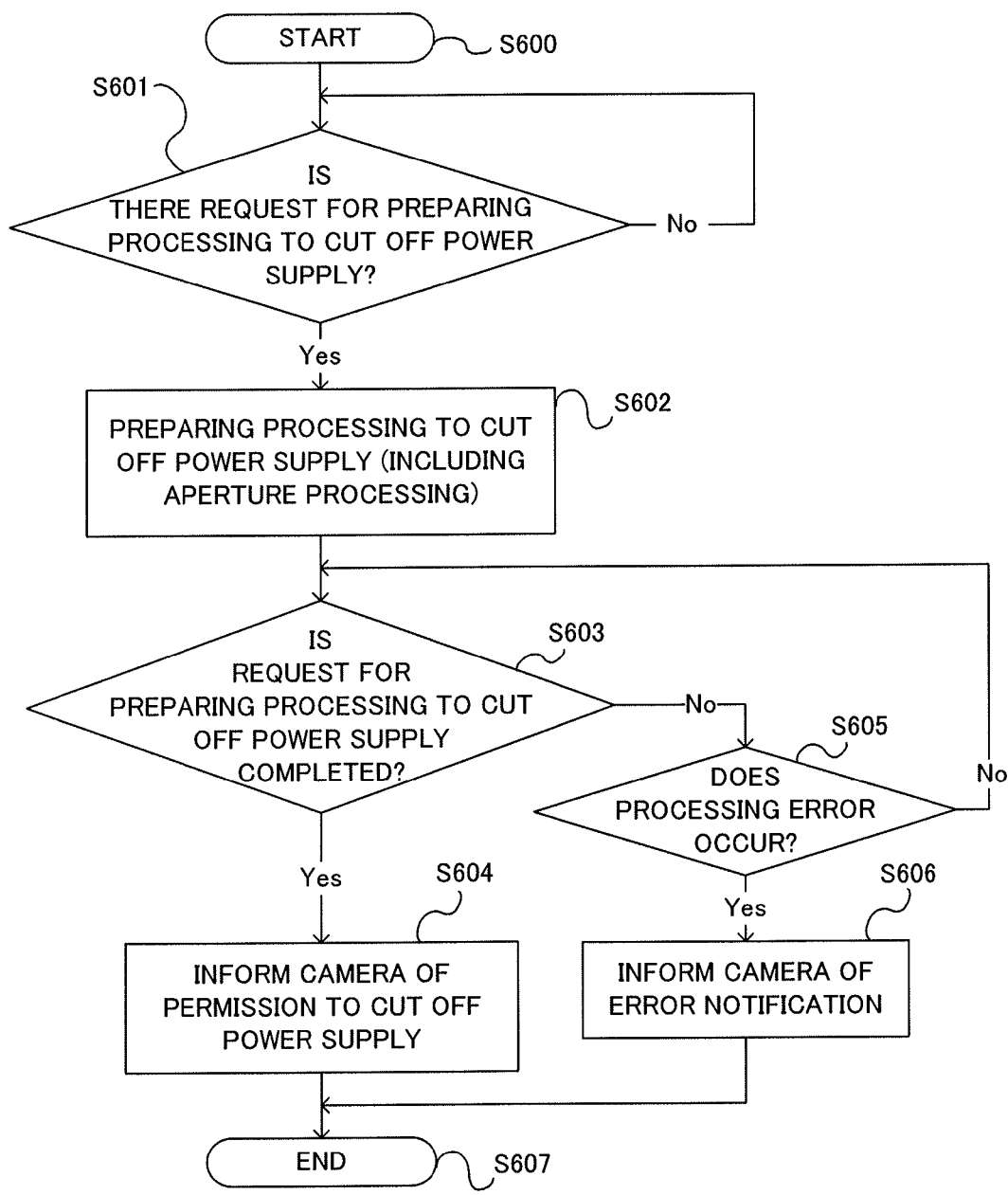
FIG. 6B is a flowchart of illustrating an operation of the interchangeable lens when the camera changes from the power-on state to the power-off state in Embodiment 1.

FIG. 6B is a flowchart of illustrating the operation of the interchangeable lens 100 when the state of the camera 10 changes from the power-on state to the power-off state. This flow is, for example, performed in accordance with a program that is stored in the lens microcomputer 211. When this flow starts in Step S600, first of all, in Step S601, the lens microcomputer 211 determines whether the request for preparing the processing to cut off the power supply is received from the camera microcomputer 20. Step S601 is repeated until the lens microcomputer 211 receives the request for preparing the processing to cut off the power supply. When the lens microcomputer 211 receives the request for preparing the processing to cut off the power supply, the flow proceeds to Step S602.

In Step S602, the lens microcomputer 211 performs the preparing processing to cut off the power supply, specifically the processing of stopping the focus, the processing of the IS drive, the processing of the retraction, and the aperture processing. The aperture processing is a processing of driving the aperture to a previously determined value so as to prevent sunlight from entering the sensor 11. Subsequently, in Step S603, the lens microcomputer 211 determines whether the preparing processing to cut off the power supply in Step S602 is completed. When the preparing processing to cut off the power supply is normally completed, the flow proceeds to Step S604. Then, in Step S604, the lens microcomputer 211 informs the camera microcomputer 20 (the camera 10) of the permission to cut off the power supply, and the flow proceeds to Step S607 and the flow is finished.

On the other hand, when the preparing processing to cut off the power supply is not normally completed in Step S604, the flow proceeds to Step S605. Then, in Step S605, the lens microcomputer 211 determines whether a processing error occurs in the preparing processing to cut off the power supply in Step S602. When the processing error does not occur in Step S605, the flow returns to Step S603, and it is determined whether the preparing processing to cut off the power supply is completed again. On the other hand, when the error occurs in Step S605, the flow proceeds to Step S606 and the lens microcomputer 211 informs the camera microcomputer 20 of the information of the error. Then, the flow proceeds to Step S607 and the flow is finished.

As illustrated in FIGS. 5A, 5B, 6A, and 6B, the camera microcomputer 20 (the controller) determines whether the power supply to the interchangeable lens 100 is stopped when the power of the camera 10 is turned off, based on the type of the interchangeable lens 100 (S502). When the power of the camera 10 is turned off and the camera microcomputer 20 determines that the power supply to the interchangeable lens 100 is stopped, the camera microcomputer 20 controls the aperture so as to change the first aperture state set in the interchangeable lens 100 to the second aperture state (S503 and S504). Then, after the control of the aperture is completed, the power supply to the interchangeable lens 100 is stopped (S507). When the power of the camera 10 is turned on after that, the camera microcomputer 20 supplies the power to the interchangeable lens 100 so as to perform an open control to change the second aperture state to the first aperture state (S304 and S404).

On the other hand, when the power of the camera 10 is turned off, the lens microcomputer 211 controls the aperture so as to change the first aperture state to the second aperture state in accordance with a command from the camera 10 (S602 and S603), and informs the camera 10 of the completion of controlling the aperture (S604). When the power of the camera 10 is turned on after that, the power is supplied from the camera 10 and then the lens microcomputer 211 performs the open control so as to change the second aperture state to the first aperture state (S403 and S404).

In the present embodiment, the camera 10 includes the terminal (the DTEF terminal 1-5) of determining the type of the interchangeable lens 100. The camera microcomputer 20 determines the type of the interchangeable lens 100 based on the voltage value inputted from the interchangeable lens 100 to the DTEF terminal 1-5.

Performing the control as described above, an optimal operation depending on the type of the interchangeable lens can be performed when the camera changes from the power-on state to the power-off state. Specifically, when the interchangeable lens is a power-off permitted lens, i.e. a lens for a moving image, the power supply to the lens is stopped in order to save a power in changing the state of the camera from the power-on state to the power-off state. In addition, the F-number is controlled to a predetermined value so as to protect the burn of sunlight on the sensor. On the other hand, when the interchangeable lens is not the power-off permitted lens, i.e. a lens for a still image, the power supply to the interchangeable lens is continued even if the state of the camera changes from the power-on state to the power-off state. Therefore, when the camera subsequently changes from the power-off state to the power-on state, data communication between the camera and the interchangeable lens, the preparing processing to start controlling the lens, including the aperture control, or the like can be omitted. Accordingly, a user can quickly perform a shooting operation.

[Embodiment 2]

Figure 7:
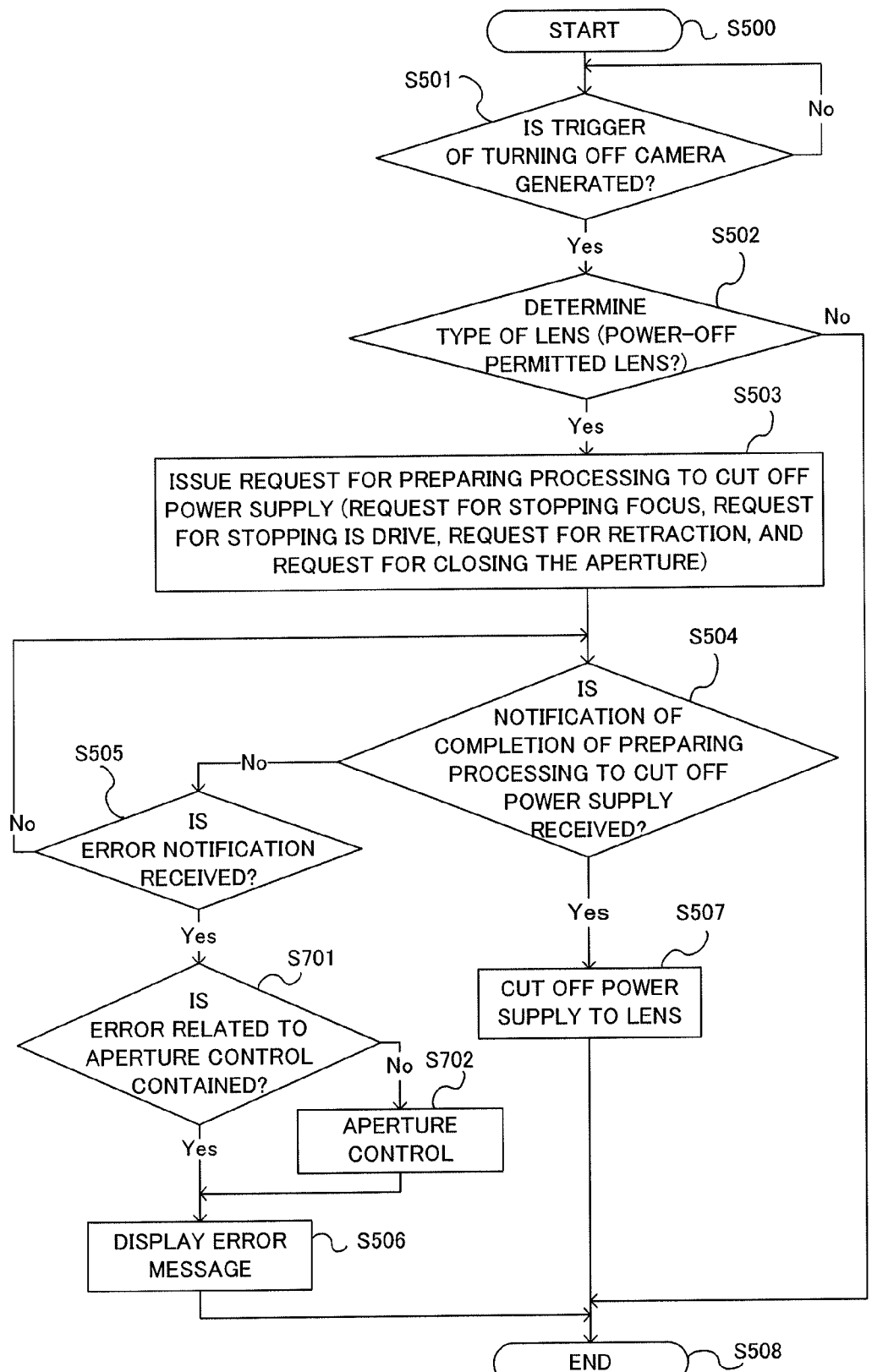
FIG. 7 is a flowchart of illustrating an operation of the camera when the camera changes from the power-on state to the power-off state in Embodiment 2.

Next, referring to FIG. 7, Embodiment 2 of the present invention will be described. FIG. 7 is a flowchart of illustrating an operation of the camera 10 when the camera 10 changes from the power-on state to the power-off state. This flow is, for example, performed in accordance with a program that is stored in the camera microcomputer 20. A configuration of the camera system 20 and operations other than the flowchart of FIG. 7 are the same as those of Embodiment 1, and therefore descriptions of them are omitted. The flowchart of FIG. 7 is different from the flowchart of FIG. 6A of Embodiment 1 in that Steps S701 and S702 are added. The other of the flow is the same as the flow of FIG. 6A, and therefore common descriptions are omitted.

In Step S505 of FIG. 7, the camera microcomputer determines whether the error notification (the error information) is received in response to the command of requesting for the power-off processing issued in Step S503. The error notification is a notification that is sent when the processing in response to the request for the preparing processing to cut off the power supply performed by the lens microcomputer 211. When the camera microcomputer 20 receives the error notification, the flow proceeds to Step S701.

In Step S701, the camera microcomputer 20 determines whether the information of the error notification received in Step S505 indicate an error related to the aperture control, i.e. whether the error related to the aperture control is contained in error factors. As a result, when the error related to the aperture control is contained in the error factors, the flow proceeds to Step S506 so as to display the information of the error notification, i.e. an error message, on the display 14, and then the flow is finished.

On the other hand, when the error related to the aperture control is not contained in the error factors in Step S701, the flow proceeds to Step S702. In Step S702, the camera microcomputer 20 issues a command to request for controlling the aperture so as to perform the aperture control. When the aperture control is completed, the flow proceeds to Step S506 so as to display the information of the error notification, i.e. the error message, on the display 14, and then the flow is finished.

As illustrated in FIG. 7, when the power of the camera 10 is turned off and the camera microcomputer 20 determines that the power supply to the interchangeable lens 100 is stopped, the camera microcomputer 20 determines whether the error notification of a power-off preparing processing is received from the interchangeable lens 100 (S505). Subsequently, when the camera microcomputer 20 receives the error notification, it determines whether the error related to the aperture control is contained (S701). When the error related to the aperture control is not contained in the error notification, the aperture control is performed so that the first aperture state is changed to the second aperture state, and then the power supply to the interchangeable lens 100 is stopped (S702).

Performing the control as described above, an optimal operation depending on the type of the interchangeable lens can be performed when the camera changes from the power-on state to the power-off state. Specifically, when the interchangeable lens is a power-off permitted lens, i.e. a lens for a moving image, the power supply to the lens is stopped in order to save a power in changing the state of the camera from the power-on state to the power-off state. In addition, the F-number is controlled to a predetermined value so as to protect the burn of sunlight on the sensor. On the other hand, when the interchangeable lens is not the power-off permitted lens, i.e. a lens for a still image, the power supply to the interchangeable lens is continued even if the state of the camera changes from the power-on state to the power-off state. Therefore, when the camera subsequently changes from the power-off state to the power-on state, data communication between the camera and the interchangeable lens, the preparing processing to start controlling the lens, including the aperture control, or the like can be omitted. Accordingly, a user can quickly perform a shooting operation. Furthermore, since the F-number at least up to a predetermined value is controlled even when the preparing processing to cut off the power supply to the interchangeable lens has failed, the burn of sunlight on the sensor can be prevented.

[Embodiment 3]

Figure 8:
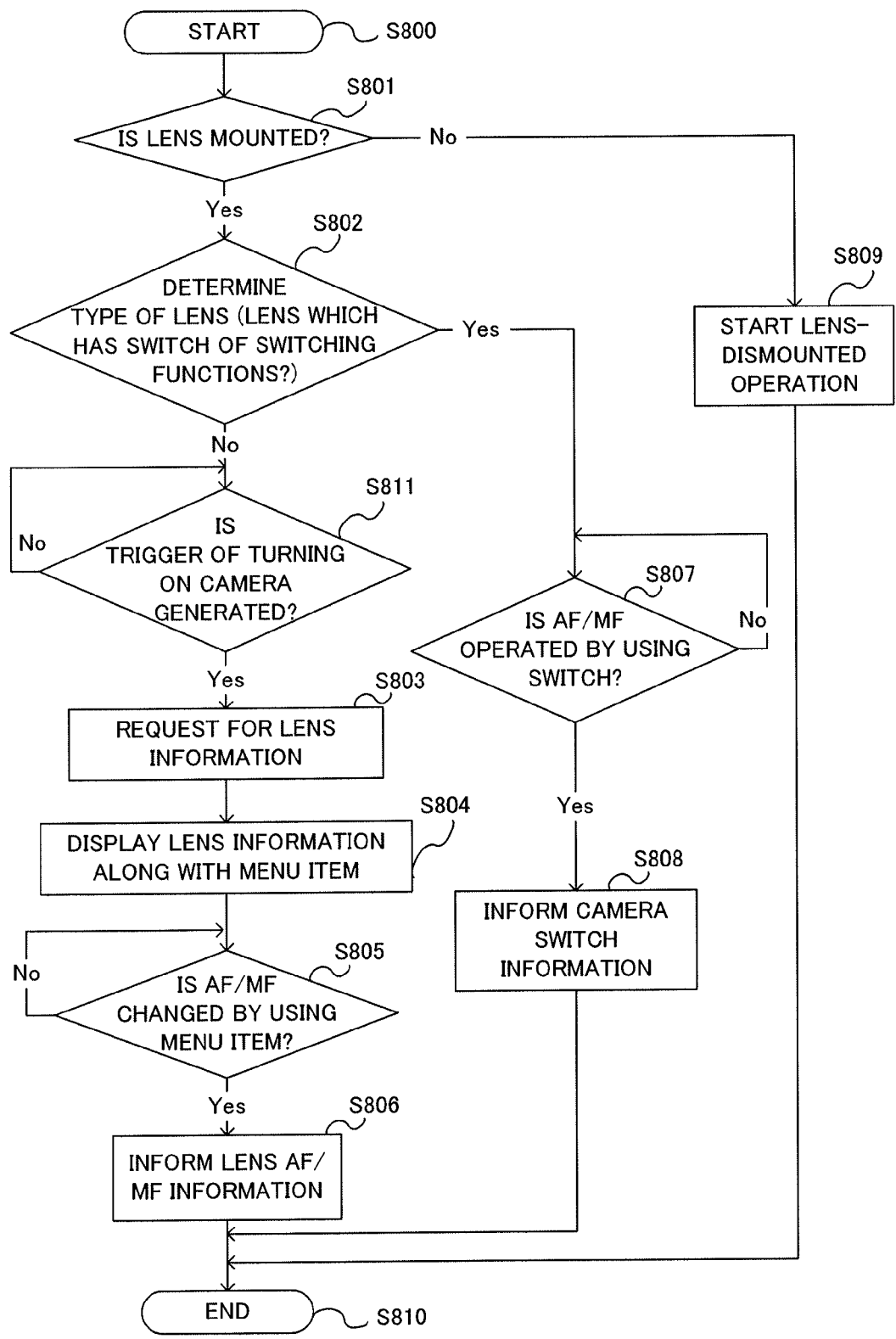
FIG. 8 is a flowchart of illustrating operations of the camera and the interchangeable lens when the power of the camera is off in Embodiment 3.

Next, referring to FIG. 8, Embodiment 3 of the present invention will be described. FIG. 8 is a flowchart of illustrating a process of switching specific functions at the time of turning off the power of the camera 10, depending on a case where the interchangeable lens 100 has a switch or a case where the interchangeable lens 100 does not have the switch. In the present embodiment, as a switch of functions, a switch of AF/MF functions will be described, but the embodiment is not limited to this. The present embodiment can also be applied to a function switch such as an IS switch or a focus preset switch, as well as the switch of the AF/MF functions. In the present embodiment, descriptions similar to those of Embodiment 1 will be omitted.

In the present embodiment, the camera microcomputer 20 (the controller) determines whether the interchangeable lens 100 has a switch to switch predetermined functions (an AF/MF switch that switches the AF/MF functions) based on the type of the interchangeable lens 100. For example, the camera microcomputer 20 determines whether the interchangeable lens 100 mounted on the camera 10 has the AF/MF switch in accordance with the following Table 2.

TABLE 2

| MOUNTED LENS | FIRST TYPE INTERCHANGEABLE lens | SECOND TYPE INTERCHANGEABLE LENS | RESERVED | NON-SUPPORTED LENS |
|---|---|---|---|---|
| DTEF_IN TERMINAL DETERMINATION OF LENS HAVING AF/MF SWITCH | 0x0000~0x007F LENS WHICH DOES NOT HAVE AF/MF SWITCH | 0x0280~0x037F LENS WHICH HAS AF/MF SWITCH | — NOT DETERMINED | — NOT DETERMINED |

More specifically, when the mounted interchangeable lens 100 is the first type interchangeable lens based on the voltage value (the AD conversion value) of the DTEF_IN terminal, the camera microcomputer 20 determines that the lens is an interchangeable lens which does not have the AF/MF switch. When the interchangeable lens 100 is the second type interchangeable lens, the camera microcomputer 20 determines that the lens is an interchangeable lens which has the AF/MF switch. When the camera microcomputer 20 detects a voltage value out of the range of the first or second reference of determining the type of the lens described above as the voltage value (the AD conversion value) of the DTEF_IN terminal, it determines that an interchangeable lens which is not supported by the camera 10 (a non-supported lens) is mounted. Alternatively, the camera microcomputer 20 reserves the determination of the type of the lens because the determination of the type of the lens cannot be normally performed. In these cases, the camera microcomputer 20 does not perform a control such as a communication of requesting for commands to the interchangeable lens 100.

When the flow of FIG. 8 starts in Step S800, first of all, in Step S801, the camera microcomputer 20 determines whether the interchangeable lens 100 is mounted on the camera 10. Specifically, as described above, the camera microcomputer 20 determines whether the interchangeable lens 100 is mounted in accordance with the voltage value of the MIF_IN terminal. When it is determined that the interchangeable lens 100 is not mounted on the camera 10 in Step S801, the flow proceeds to Step S809 and an operation which is performed when the interchangeable lens 100 is not mounted (an operation with a lens dismounted) starts. Specifically, a warning indicating that the interchangeable lens is dismounted is displayed on the display 14.

On the other hand, when it is determined that the interchangeable lens 100 is mounted on the camera 10 in Step S801, the flow proceeds to Step S802. In Step S802, the camera microcomputer 20 determines whether the mounted interchangeable lens 100 is a lens which has the switch of switching the functions. This determination is, as described above, performed based on the voltage level outputted from the lens-type determining portion 213. In Step S802, when it is determined that the interchangeable lens 100 mounted on the camera 10 is the first type interchangeable lens, it is determined that the lens is a lens which does not have the AF/MF switch and then the flow proceeds to Step S811. On the other hand, when it is determined that the interchangeable lens 100 is the second type interchangeable lens, it is determined that the lens has the AF/MF switch and then the flow proceeds to Step S807.

In Step S811, the camera microcomputer 20 determines whether a trigger to change the state of the camera 10 from the power-off state to the power-on state occurs. This trigger occurs by an operation in which a user switches a power switch (not shown) of the camera 10 from the off-state to the on-state or the like. When the trigger to be changed to the power-on state, the flow proceeds to Step S803.

Subsequently, in Step S803, the camera microcomputer 20 issues a command of requesting lens information, and then obtains the lens information from the lens microcomputer 211. Then, in Step S804, the camera microcomputer 20 displays the obtained lens information along with menu items. Thus, when the interchangeable lens 100 is a lens which does not have the AF/MF switch, the switching of the AF and the MF is performed by using the menu items. On the other hand, when the interchangeable lens 100 is a lens which has the AF/MF switch, the switching of the AF and the MF is performed by using the function switch.

Subsequently, in Step S805, the camera microcomputer 20 determines whether the AF or the MF is changed by using the menu items. When the AF or the MF is changed, the user selects an item of switching the AF and the MF from the menu items displayed in Step S804 so as to perform the change of the AF and the MF. Step S805 is repeated until the change of the AF and the MF is performed. When the AF and the MF is changed in Step S805, the flow proceeds to Step S806. Then, in Step S806, the camera microcomputer 20 informs the lens microcomputer 211 of the changed AF/MF information, and in Step S810, this flow is finished.

On the other hand, in Step S807, the lens microcomputer 211 determines whether the switching (operation) of the AF and the MF is performed by using the AF/MF switch (not shown) of the interchangeable lens 100. This determination is repeated until the switching operation of the AF and the MF is performed. When the switching operation of the AF and the MF is performed, the flow proceeds to Step S808. Then, in Step S808, the lens microcomputer 211 informs the camera microcomputer 20 of the switched information (switch information). The camera microcomputer 29 receiving this notification changes the state to the power-on state even when the camera 10 is in the power-off state, and the camera microcomputer 20 changes the setting in the camera 10 in accordance with the notified information.

As illustrated in FIG. 8, when the interchangeable lens 100 has the switch, the camera microcomputer 20 receives the notification that the switch is switched from the interchangeable lens 100 (S808). Then, the camera microcomputer 20 automatically sets the power of the camera 10 to ON so as to reflect the switching of the predetermined function (the function of switching the AF and the MF) in the camera 10. On the other hand, when the interchangeable lens 100 does not have the switch, the power of the camera 10 is turned on and then the camera microcomputer 20 displays the necessity of switching the predetermined function as the menu items on the display 14 (S804).

On the other hand, the lens-type determining portion 213 determines whether the interchangeable lens 100 has the switch of switching the predetermined function based on the type of the interchangeable lens 100 (S802). When the interchangeable lens 100 has the switch, the lens microcomputer 211 turns on the power of the camera 10 and informs the camera 10 of the switching information of the switch so as to reflect the switching of the predetermined function in the camera 10 (S808).

As described above, when the interchangeable lens 100 does not have the AF/MF switch, the camera 10 is changed to the power-on state and then the switching of the AF and the MF is performed by using the menu items. On the other hand, when the interchangeable lens 100 has the AF/MF switch, the lens microcomputer 211 that detects the switching of the AF/MF switch informs of the changed information. The camera microcomputer 20 that receives this notification is automatically set to be in the power-on state so as to reflect the changed information. According to this processing, even if any of the interchangeable lens which has the AF/MF switch and the interchangeable lens which does not have the AF/MF switch is mounted on the camera 10, the switch processing of the AF/MF switch can be appropriately performed. In addition, when the interchangeable lens 100 has the AF/MF switch even if the camera 10 is in the power-off state, the user can quickly switch the AF and the MF by using the switch to be able to take an image. In the present embodiment, the switching function of the switch is focused on the switching of the AF and the MF, but the embodiment is not limited to this and may also be applied to other function switches such as an IS switch or a focus preset switch.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-159934, filed on Jul. 18, 2012, which is hereby incorporated by reference herein in its entirety.

What is claimed is:

1. An image pickup apparatus on which an interchangeable lens is removably mounted, the image pickup apparatus comprising:
   an image pickup element configured to perform a photoelectric conversion of an optical image formed via the interchangeable lens; and
   a controller configured to control a power supply to the interchangeable lens mounted on the image pickup apparatus,
   wherein when the mounted interchangeable lens is a first type interchangeable lens and a power is turned off, the controller performs an aperture control so as to change a first aperture state set in the interchangeable lens to a second aperture state and then stops the power supply to the interchangeable lens, and
   wherein when the mounted interchangeable lens is a second type interchangeable lens which is a different lens type from the first type interchangeable lens and the power is turned off, the controller maintains the power supply differently from a case where the mounted interchangeable lens is the first type interchangeable lens.

2. The image pickup apparatus according to claim 1, wherein when the power of the image pickup apparatus is turned on, the controller supplies the power to the interchangeable lens to perform an open control so as to change the second aperture state to the first aperture state.

3. The image pickup apparatus according to claim 1, wherein when the power is turned off and the controller determines that the power supply to the interchangeable lens is stopped, the controller performs the aperture control so as to change the first aperture state to the second aperture state and then stops the power supply to the interchangeable lens.

4. The image pickup apparatus according to claim 1, wherein when the power of the image pickup apparatus is turned off and the controller determines that the power supply to the interchangeable lens is stopped and receives an error notification of a power-off preparing processing from the interchangeable lens, the controller determines whether an error related to the aperture control is contained in the error notification, and
   wherein when the error related to the aperture control is not contained in the error notification, the controller performs the aperture control so as to change the first aperture state to the second aperture state and then stops the power supply to the interchangeable lens.

5. The image pickup apparatus according to claim 1, wherein the second aperture state is a minimum aperture state.

6. The image pickup apparatus according to claim 1, further comprising a terminal to determine a type of the interchangeable lens,
   wherein the controller determines the type of the interchangeable lens based on a voltage value inputted from the interchangeable lens to the terminal.

7. An image pickup apparatus on which an interchangeable lens is removably mounted, the image pickup apparatus comprising:
   an image pickup element configured to perform a photoelectric conversion of an optical image formed via the interchangeable lens; and
   a controller configured to determine whether the interchangeable lens has a switch that switches a predetermined function based on a type of the interchangeable lens,
   wherein when the controller determines that the interchangeable lens has the switch, the controller turns on a power of the image pickup apparatus and reflects switching of the predetermined function in the image pickup apparatus after receiving a notification indicating that the switch has been switched from the interchangeable lens, and
   wherein when the controller determines that the interchangeable lens does not have the switch, the controller displays necessity of the switching of the predetermined function as a menu item on a display after the power of the image pickup apparatus is turned on.

8. The image pickup apparatus according to claim 7, wherein the switch is an auto focus/manual focus (AF/MF) switch that switches auto focus and manual focus functions.

9. A camera system comprising:
   an image pickup apparatus according to claim 7, and
   an interchangeable lens removably mounted on the image pickup apparatus.

10. An interchangeable lens removably mounted on an image pickup apparatus, the interchangeable lens comprising:
   an aperture unit configured to adjust a light amount passing through the interchangeable lens; and a controller configured to control the aperture unit, wherein the controller performs an aperture control so as to change a first aperture state to a second aperture state in accordance with a predetermined command from the image pickup apparatus and then informs the image pickup apparatus of completion of the aperture control without a subsequent command from the image pickup apparatus; wherein a predetermined voltage level is obtained at a predetermined terminal of the interchangeable lens when being connected with the image pickup apparatus, and wherein the predetermined command from the image pickup apparatus is issued in a case where the predetermined voltage level is obtained at the predetermined terminal.

11. The interchangeable lens according to claim 10, wherein the predetermined command is issued when the image pickup apparatus is turned off.

12. The interchangeable lens according to claim 10, wherein the controller controls the aperture unit to open an aperture of the interchangeable lens when a power supply from the image pickup apparatus starts.

13. The interchangeable lens according to claim 10,
wherein when the power is cut off, the controller performs the aperture control so as to change the set first aperture state to the second aperture state in accordance with the predetermined command from the image pickup apparatus, and
wherein when the aperture control is not completed, the controller informs the image pickup apparatus of an incompletion of the aperture control.

14. The interchangeable lens according to claim 10,
wherein when the power is cut off, the controller performs the aperture control so as to change the set first aperture state to the second aperture state in accordance with the predetermined command from the image pickup apparatus, and
wherein when the aperture control is not completed, the controller informs the image pickup apparatus of an error notification.

15. The interchangeable lens according to claim 10, wherein the aperture unit in the second aperture state is smaller in aperture size than that in the first aperture state.

16. An interchangeable lens removably mounted on an image pickup apparatus, the interchangeable lens comprising:
an aperture unit configured to adjust an aperture size of the interchangeable lens; a terminal configured to become a predetermined voltage level when being connected with the image pickup apparatus; and
a controller configured to control the aperture unit,
wherein when a power is cut off, the controller performs an aperture control so as to change a first aperture state to a second aperture state in accordance with a predetermined command from the image pickup apparatus in a case where the predetermined voltage level is obtained at the terminal, and then informs the image pickup apparatus of completion of the aperture control.

17. The interchangeable lens according to claim 16, wherein the controller controls the aperture unit to open an aperture of the interchangeable lens when a power supply from the image pickup apparatus starts.

18. The interchangeable lens according to claim 16, wherein when the aperture control is not completed, the controller informs the image pickup apparatus of the incompletion of the aperture control.

19. The interchangeable lens according to claim 16, wherein when the aperture control is not completed, the controller informs the image pickup apparatus of an error notification.

20. The interchangeable lens according to claim 16, wherein the aperture unit in the second aperture state is smaller in aperture size than that in the first aperture state.

* * * * *